(12) United States Patent
Chakravarthy et al.

(10) Patent No.: US 11,977,361 B2
(45) Date of Patent: May 7, 2024

(54) INTERACTIVE FIELD DEVICE INTERFACE FOR MONITORING AND CONTROLLING AN INDUSTRIAL PROCESS BY INDUSTRIAL AUTOMATION SYSTEM

(71) Applicant: ABB Schweiz AG, Baden (CH)

(72) Inventors: Suhas Chakravarthy, Bangalore (IN); Kamath Shanthala, Bangalore (IN); Husain Sanoob, Bangalore (IN)

(73) Assignee: ABB Schweiz AG, Baden (CH)

( * ) Notice: Subject to any disclaimer, the term of this patent is extended or adjusted under 35 U.S.C. 154(b) by 119 days.

(21) Appl. No.: 17/563,310

(22) Filed: Dec. 28, 2021

(65) Prior Publication Data

US 2022/0121165 A1 Apr. 21, 2022

Related U.S. Application Data

(63) Continuation of application No. PCT/IB2020/056084, filed on Jun. 26, 2020.

(30) Foreign Application Priority Data

Jun. 28, 2019 (IN) .............................. 201941025901

(51) Int. Cl.
G05B 19/042 (2006.01)

(52) U.S. Cl.
CPC ..... G05B 19/0423 (2013.01); G05B 19/0428 (2013.01); G05B 2219/13023 (2013.01); G05B 2219/13044 (2013.01)

(58) Field of Classification Search
CPC ............ G05B 19/0423; G05B 19/0428; G05B 2219/13023; G05B 2219/13044

(Continued)

(56) References Cited

U.S. PATENT DOCUMENTS 11,269,790 B2 * 3/2022 Hughes .............. G05B 19/0425
2016/0100437 A1 4/2016 Armstrong et al.
(Continued)

FOREIGN PATENT DOCUMENTS

DE 102018202018 B3 5/2019
EP 3180660 A1 6/2017

OTHER PUBLICATIONS

Intellectual Property India, Office Action in Indian Patent Application No. 201941025901, 5 pp. (dated Feb. 4, 2021).
(Continued)

*Primary Examiner* — Md Azad
(74) *Attorney, Agent, or Firm* — Leydig, Voit & Mayer, Ltd.

(57) ABSTRACT

A system and method for interactively communicating with a field device of an industrial automation system for performing a function in relation to monitoring and controlling an industrial process of a power plant includes a field device is associated with a gateway interface device (GID) including NLP algorithm, and communicatively coupled to an interactive device. The GID receives a first instruction associated with the function in relation to monitoring and controlling the industrial process, in natural language format, and converts the first instruction into a second instruction based on the NLP algorithm, where the second instruction has structured format native to the field device. The GID sends the second instruction to the field device for performing the function, receives an information associated to the function performed by the field device, and sends the information for displaying in the interactive device, the function performed by the field device.

7 Claims, 6 Drawing Sheets

(58) Field of Classification Search
USPC .......................................................... 700/86
See application file for complete search history.

(56) References Cited

U.S. PATENT DOCUMENTS

| | | | |
|---|---|---|---|
| 2016/0274552 A1* | 9/2016 | Strohmenger | G05B 15/02 |
| 2017/0097621 A1 | 4/2017 | Ackmann et al. | |
| 2017/0293276 A1 | 10/2017 | Hubauer et al. | |
| 2017/0371311 A1* | 12/2017 | Aparicio Ojea | G05B 19/056 |
| 2019/0072290 A1 | 3/2019 | Stoner et al. | |
| 2019/0107827 A1 | 4/2019 | Dhakshinamoorthy et al. | |
| 2020/0133221 A1* | 4/2020 | Bünzli Wurzer | H04L 41/0853 |
| 2022/0121165 A1* | 4/2022 | Chakravarthy | G05B 19/0423 |

OTHER PUBLICATIONS

European Patent Office, International Search Report in International Patent Application No. PCT/IB2020/056084, 4 pp. (dated Oct. 5, 2020).

European Patent Office, Written Opinion in International Patent Application No. PCT/IB2020/056084, 10 pp. (dated Oct. 5, 2020).

* cited by examiner

INTERACTIVE FIELD DEVICE INTERFACE FOR MONITORING AND CONTROLLING AN INDUSTRIAL PROCESS BY INDUSTRIAL AUTOMATION SYSTEM

CROSS-REFERENCE TO RELATED APPLICATIONS

This patent application claims the benefit of Indian Application Ser. No. 201941025901 filed on 28 Jun. 2019, and of International Application Ser. No. PCT/IB2020/056084, filed on Jun. 26, 2020, which are incorporated herein in their entirety by reference.

FIELD OF THE DISCLOSURE

The present disclosure relates generally to an industrial measurement device, such as a field device deployed in an industrial process. More particularly, the present disclosure relates to systems and methods for interactively communicating with the field device to perform at least one function in relation to monitoring and controlling the industrial process by an industrial automation system.

BACKGROUND OF THE INVENTION

Industrial measurement devices, such as field devices are used for measuring parameters, such as temperature, pressure, flow rate, and the like in various industrial processes by an industrial automation system. Such field devices may use a Human Machine Interface (HMI) device, or wired or wireless communication mechanism to receive instructions from operators, to measure parameters and communicate the measured parameters with the operators. Generally, each field device is preconfigured to interpret the instructions received in a structured format native to that particular field device. For example, to determine type of sensor that has identity no. 10, the field device may be pre-configured to interpret the instruction received in structured format, such as get "sensor type 10". Therefore, the operators working in the industrial automation system may need constant trainings to understand all structured formats to communicate with the field device. Further, the structured format may be different for the field device manufactured from various companies. Thus, the operators may additionally need constant trainings to understand all structured formats for the field device manufactured from each company. Further, the operators may need to identify the type of field device been deployed in the industrial automation system and accordingly issue the instruction in the structured format corresponding to the identified field device. Thus, the operators may need to put additional time and efforts in learning the structured format for various field devices. Also, the industrial process having field devices from various companies may lead to potential mistakes from the operators.

To address the aforementioned nuisances, software packages, such as a field device integration software or a field device management software are provided by various field device manufacturers, so as to enable the operators to impeccably communicate with the field devices. However, the operators still require to navigate through detailed menus of the software programs to interact with the field device for performing function in relation to monitoring and controlling the industrial process.

There is accordingly, a need for a method and a system to demystify interaction with the field devices for allowing the operators to interactively communicate with the field devices to perform at least one function in relation to monitoring and controlling an industrial process by an industrial automation system.

BRIEF SUMMARY OF THE INVENTION

An aspect of the disclosure provides a method for interactively communicating with at least one field device of a plurality of field devices of an industrial automation system for performing at least one function in relation to at least one of monitoring and controlling an industrial process associated to an operation of a process plant.

In such aspect of the invention the at least one field device is associated with a gateway interface device (GID) and communicatively coupled to at least one interactive device, and the GID includes at least one natural language processing (NLP) algorithm. The method includes the GID receiving a first instruction associated with the at least one function in relation to the at least one of monitoring and controlling the industrial process, in a natural language format, from the at least one interactive device. In some embodiments of the invention, the first instruction may be either in a text or a speech or a graphical user interface (GUI) form.

The method further includes the GID converting the first instruction into a second instruction based on the at least one NLP algorithm, where the second instruction is in a structured format native to the at least one field device. In some embodiments of the invention, the method of converting the first instruction into the second instruction includes interpreting the first instruction to convert the first instruction into the second instruction and interactively communicating the second instruction with the at least one interactive device to receive a feedback from the at least one interactive device on the second instruction.

Further, the method includes the GID sending the second instruction to the at least one field device for performing the at least one function in relation to the at least one of monitoring and controlling the industrial process. The method further includes the GID receiving an information associated to the at least one function performed by the at least field device and sending the information for displaying in the at least one interactive device, the at least one function performed by the at least one field device in relation to the at least one of monitoring and controlling the industrial process associated to the operation of the process plant.

Another aspect of the disclosure provides a system of a gateway interface device (GID) and at least one field device in an industrial automation system to interactively communicate with the at least one field device for performing at least one function in relation to at least one of monitoring and controlling an industrial process associated to operation of a process plant.

In such aspect of the invention, the at least one field device is communicatively coupled to at least one interactive device. In some embodiments, the GID is communicatively coupled to the at least one field device. In some other embodiments, the GID is mounted on the at least one field device and in such embodiments, the GID may include a human machine interface (HMI) for interactively communicating with users of the industrial automation system. Further, the GID includes a computational unit including at least one natural language processing (NLP) algorithm, a communication unit, and a field device gateway unit associated to each other.

The communication unit receives a first instruction associated with the at least one function in relation to the at least one of monitoring and controlling the industrial process, in a natural language format, from the at least one interactive device. In some embodiments of the invention, the first instruction may be either in a text or a speech or a graphical user interface (GUI) form.

The computational unit converts the first instruction into a second instruction based on the at least one NLP algorithm, where the second instruction is in a structured format native to the at least one field device. In some embodiments of the invention, the computational unit comprises an application module interpreting the first instruction to convert the first instruction into the second instruction and interactively communicating the second instruction with the at least one interactive device to receive a feedback from the at least one interactive device on the second instruction.

The field device gateway unit sends the second instruction to the at least one field device for performing the at least one function in relation to the at least one of monitoring and controlling the industrial process, and receives an information associated to the function performed by the at least field device.

The communication unit further sends the information for displaying in the at least one interactive device, the function performed by the at least one field device in relation to the at least one of monitoring and controlling the industrial process associated to the operation of the process plant.

DETAILED DESCRIPTION OF THE INVENTION

Figure 1:
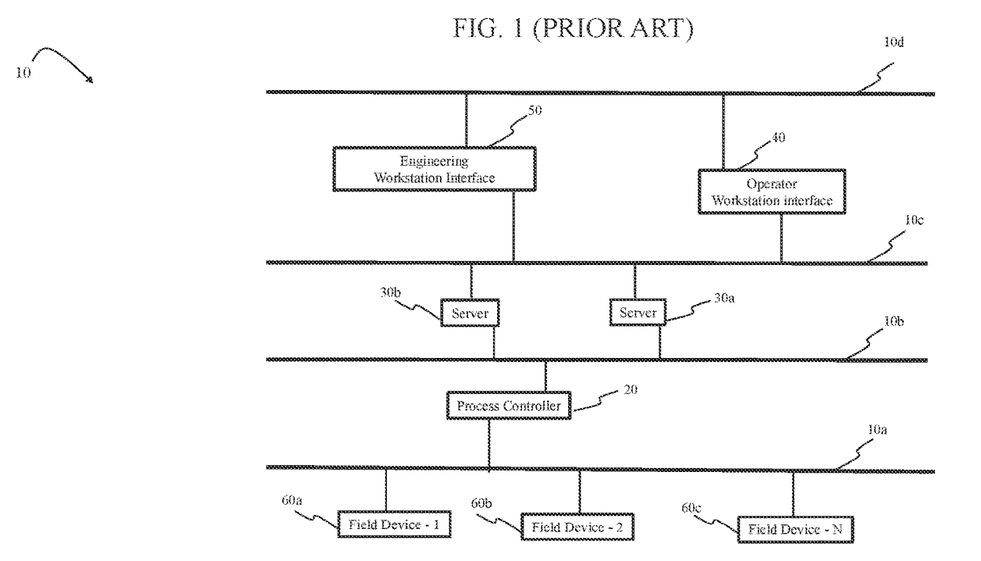
FIG. 1 is a conventional system architecture of an industrial automation system managing an industrial process associated to an operation of a process plant.

FIG. 1 illustrates a conventional system architecture (10) of an industrial automation system for managing an industrial process associated to an operation of a process plant. Specifically, the conventional architecture (10) illustrates monitoring and controlling the industrial process of the process plant, such as a power plant, an oil and gas plant, and the like. The conventional architecture (10) highlights details of a typical communication between an operator workstation interface (40) or engineering workstation interface (50) and a plurality of field devices (60a-60c). The plurality of field devices (60a, 60b, 60c) may include monitoring devices, such as sensors and control devices, such as actuators for monitoring and controlling the industrial processes associated to an operation of the process plant respectively.

It should be noted herein that the sensors may include temperature sensor, pressure sensor, flow rate sensor, humidity sensor, and the like. Similarly, the actuators may include valves, positioners, and the like. The plurality of field devices (60a-60c) may be coupled to one or more industrial equipment's (not shown in FIG. 1) of the process plant via a process controller (20) for monitoring one or more industrial process variables like temperature, pressure, flow rate, humidity, etc. and/or controlling the one or more industrial process variables like flow rate, pressure, and the like of the process plant.

The communication between the process controller (20) and the plurality of field devices (60a-c) is facilitated through a field network (10a) using field network communication protocols such as Highway Addressable Remote Transducer (HART), FOUNDATION Fieldbus, Profibus, Modbus, and the like. The process controller (20) may also be configured to store and archive process data obtained from the plurality of field devices (60a-c) onto servers (30a, 30b). A control network (10b) may enable communication between the process controller (120) and the servers (30a, 30b). The process data or diagnostic data stored in the servers (30a, 30b) may be accessed by the engineering workstation interface (50) or/and the operator workstation interface (40).

During operation, the operator and/or engineering workstation interfaces (40, 50) may send instruction to the process controller (20) to monitor any task with the plurality of field devices (60a-c). Upon such instruction, the plurality of field devices (60a-c) may determine the industrial process parameters, such as temperature, pressure, and flow rate and transmit the process data from the plurality of field devices (60a-c) to the operator or engineering workstation interfaces (40, 50) using the field network (10a). From the information about the process data, the operator or engineering workstation interface may send control instruction to the plurality of field devices (60a-c), such as an actuator to modify a specific parameter of the industrial process. The workstation interfaces (40, 50) may import data from the servers (30a, 30b) to perform any analysis (such as trend analysis) to decide on the control instruction to be sent to the process controller (20) in response to such analysis.

The workstation interfaces (40, 50) may acquire data from the servers (30a, 30b) over a server network (10c). Further, the operator or the engineering workstations (40, 50) may be interfaced with a plant network (10d) to communicate with other external clients (not shown in FIG. 1). In such a conventional system architecture (10), user using the engineering or operator workstation interfaces (40, 50) for interacting with the plurality of field devices (60a-60c), may need constant trainings, as well as constant consultation with operating instructions. Such operating instructions might involve knowing how to access specific field device of the plurality of field devices (60a-c), what commands to issue, and how to address each of the plurality of field devices (60a-c) with respect to the instruction queues etc.

The plurality of field devices (60a-c) may only interpret specific structured instructions and the user might need to have familiarity with those specific instructions and their structure. If there are any changes in the field device from the plurality of field devices (60a-c) used in the process plant, such as replacement from a different vendor, the user may need to learn the structured format associated with a changed field device from the plurality of file devices (60a-c).

Thus, the users in the automation industry may have to constantly learn and re-learn the different operating mechanisms of various vendor instruments. Thus, the conventional system architecture (10) has disadvantages such as need for additional effort in training the users and may lead to potential mistakes from the users.

Figure 2:
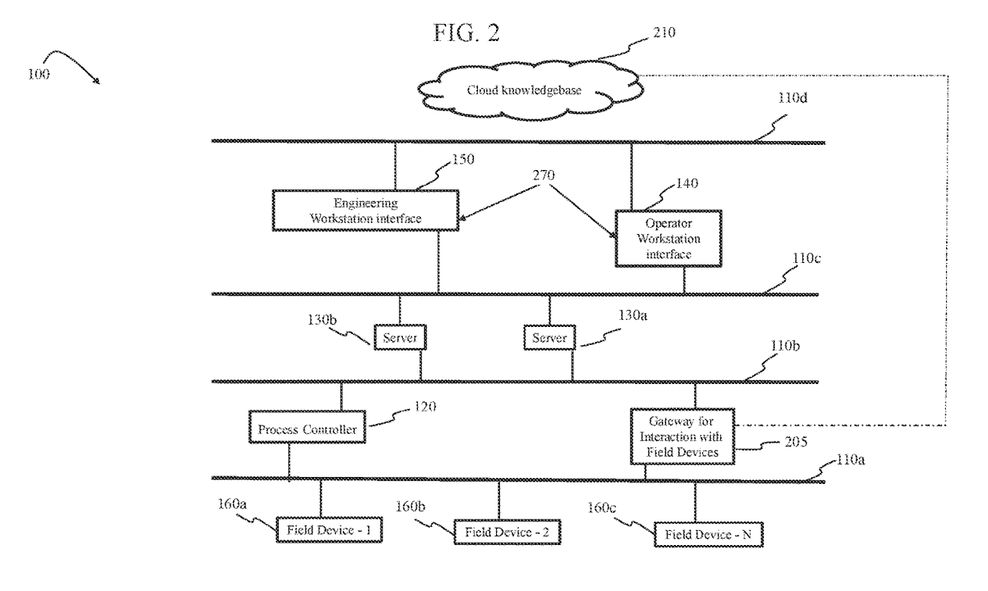
FIG. 2 is a system architecture of an industrial automation system managing an industrial process associated to an operation of a process plant, according to an embodiment of the present invention.

FIG. 2 illustrates a system architecture (100) of an industrial automation system for managing an industrial process associated to an operation of a process plant, according to an embodiment of the present invention. The system architecture is substantially similar to the conventional system architecture (10), but with an addition of a gateway interface device "GID" (205) and a cloud knowledgebase (210). In one embodiment of the invention, the GID (205) is configured to have computational and storage capabilities, in addition to communication capabilities. It should be noted herein that the computation capabilities of the GID (205) may also be referred to as a "computational unit."

In one or more embodiments, the computational unit 5 may include processors and memories, and configured to process tasks related to the operation of the process plant. In one embodiment, the GID (205) is a server. In another embodiment, the GID (205) is an edge device. In some other embodiments, the GID is a router. In one or more embodiments, the GID (205) may be hosted as a cloud-based service. In the illustrated embodiment, the GID (205) is interfaced with a field network (110a) to enable the GID (205) to communicate with a plurality of field devices (160a, 160b, 160c). Similarly, the GID (205) may also be interfaced with a control network (110b) to enable the GID (205) to have a bi-directional communication with servers (130a, 130b). Thus, the GID (205) may access data stored on servers (130a, 130b) that may correspond to historical process data as it was described in reference to the FIG. 1. Further, the GID (205) provides an interactive interface for an engineering or operator workstation interfaces (140, 150) to interactively communicate with at least one field device of the plurality of field devices (160a-c) for performing at least one function in relation to at least one of monitoring and controlling an industrial process associated to an operation of a process plane.

Thus, the GID (205) acts as a bridge between the engineering or operator workstation interfaces (140, 150) and the plurality of field devices (160a-c) to enable the user for communicating with at least one field device of the plurality of field device (160a-c) in a natural language format using either a speech, a text, or/and graphical user interface (GUIs). In some embodiments, the engineering or operator workstation interfaces (140, 150) may also be referred to as an interactive device (270). The role of the GID (205), its architecture (i.e., layout of its internal modules), its characteristics (i.e., function and work flow in its internal modules) and configurations (i.e., type of software libraries utilized, training and testing of the software libraries), and the role of cloud knowledgebase (210) are discussed in detailed below.

Figure 3:
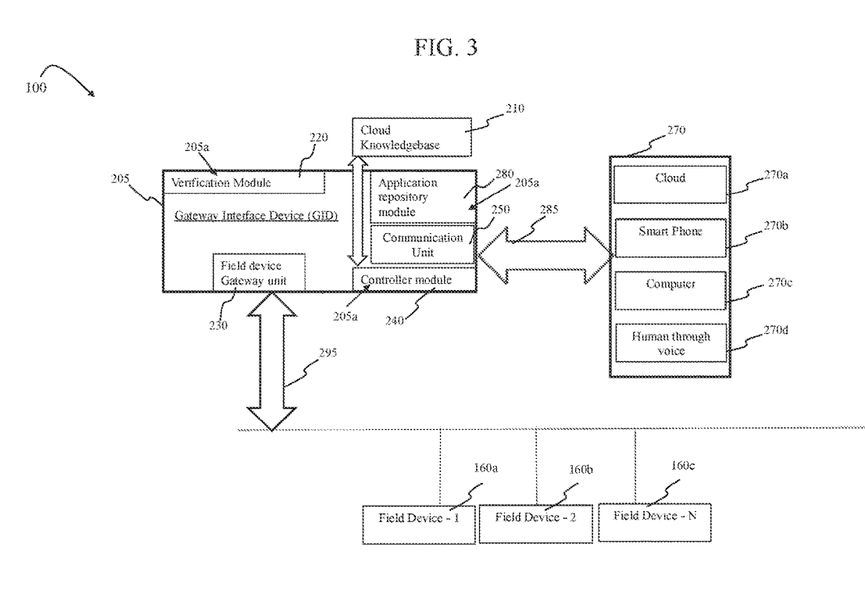
FIG. 3 is a simplified view of the system architecture referred in FIG. 2, illustrating interaction between a gateway interface device (GID), an interactive device, and a plurality of field devices for managing the industrial process associated to the operation of the process plant, according to an embodiment of the present invention.

FIG. 3 illustrates a simplified view of the system architecture (100) referred to FIG. 2 illustrating interaction between a gateway interface device (GID) (205), an interactive device (270), and a plurality of field devices (160a-c) for managing the industrial process associated to the operation of the process plant, according to an embodiment of the present invention. The GID (205) may be a physical hardware device such as a server, a router, and the like. The GID (205) may act as a gate between the at least one field device of the plurality of field devices (160a-c) and the user/operator. The GID (205) may enable bi-directional data traffic to flow between the field devices (160a, 160b, 160c) and the interactive device (270) over a wide variety of communication protocols. In one or more embodiments, the GID (205) includes a computational unit (205a), a communication unit (250), and a field device gateway unit (230) associated to each other.

The GID (205) receives a first instruction, from the interactive device (270). In the illustrated embodiment, the interactive device (270) may be any such device that the user (not shown in FIG. 3) may use to send the instruction to the GID (205). The format of the first instruction may be in the form of a text or in the form of a speech or in the form a graphical user interface (GUI) input. The text and the speech inputs may be in a natural language of the user. Furthermore, the user may not worry about the structure of the first instruction, since the GID (205) is configured to interpret the first instruction and convert the first instruction into a second instruction having format native to the at least one field device of the plurality of field devices (160a-c).

The process of converting the first instruction into the second instruction is discussed in detail below. In one or more embodiments of the invention, the GID (205) hosts a plurality of software modules (220, 230, 240, 250, 280) that facilitate the interactions between the user and the plurality of field devices (160a-c) using the GID (205) as the bridge. The software modules (220, 230, 240, 250, 280) may include a verification module (220), a field device gateway unit (230), a controller module (240), a communication unit (250), and an application repository module (280). At least some of the software modules (220, 230, 240, 250, 280) executing instruction to perform at least one function in relation to at least one of monitoring and controlling the industrial process associated to the operation of the process plant may be referred to as the computation unit (205a). In the illustrated embodiments, the verification module (220), the controller module (240), and the application repository module (280) are referred to as the computation unit (205a).

In some embodiments of the invention, the verification module (220) may enable the user to identification using secure credentials through mechanisms such as user ID authentication that may be sent through a registered email or phone number of the user. These secure credentials may be exchanged between the user and the GID (205) for verification purpose. The verification module (220) may also constitute of biometric authentication that could involve processing of biological inputs of the users, such as fingerprint or face recognition authentication to validate unique users of the industrial automation system.

The field device gateway unit (230) is provided with software applications to facilitate data transfer between the GID (205) and the plurality of field devices (160a-c) via a fieldbus communication protocol link (295). The field device gateway unit (230) is configured to support a wide range of the fieldbus communication protocols, including PROFINET, PROFIBUS, HART, Foundation Fieldbus, CanOpen, Modbus, and the like. The field device gateway unit (230) is also provided with application functions that facilitate communication protocol conversions or translation such as HART to Modbus data format converter. The application functions in the field device gateway unit (230) may convert information from the at least one field device of the plurality of field devices (160a-c) into a protocol that any other software module may require to communicate. The field device gateway unit (230) therefore enables GID (205) to connect and communicate with the plurality of field devices (160a-c) or any other devices by sharing the instructions/information in appropriate formats through appropriate protocols.

Continuing further with FIG. 3, the GID (205) is provided with the controller module (240) which includes software applications configured to work with text or speech. The controller module (240) hosts various algorithms that enables the controller module (240) to work with first instruction received in text or speech form received from the at least one interactive device (270). The various algorithms hosted in the controller module (240) uses techniques of natural language processing (NLP) to preprocess the first instruction. In some embodiments, pre-processing the first instruction may include conversion of voice-data to spectrograms to capture human speech characteristics, improving signal-to-noise ratio through use for various noise reduction techniques (such as spectral subtraction, adaptive noise cancellation, and the like), use speech-to-text conversion tools to convert the first instruction in speech form into text form.

Further, the controller module (240) includes an intent extraction software, which is a type of Natural-Language-Understanding (NLU) software that helps to understand the type of action conveyed in the first instruction. Once the intent of the first instruction is deciphered, it is relayed to the user for confirmation. The communication unit (250) is provided with software applications to facilitate data transfer between the GID (205) and the at least one interactive device (270) via a communication protocol link (285). In some embodiments, the at least one interactive device (270) is communicatively coupled to the GID (205) using a wired or wireless communication medium. In some embodiments, the wired communication medium may include coaxial cable, fiber optic cable, and the like and the wired communication technology may include local area network (LAN), wide area network (WAN), and the like. Similarly, the wireless communication medium may include of radio waves, microwaves, Infrared waves, and the like and the wireless communication technology may include wireless LAN, Bluetooth networks, and the like.

In some embodiments, the at least one interactive device (270) may be any devices through which the user may interact with the GID (205) and provide instructions to the at least field device of the plurality of field devices (160a-c) and also receive information from the at least one field device of the plurality of field devices (160a-c) so as to display the function performed by the at least one field device of the plurality of field devices (160a-c) in the at least interactive device (270).

In some embodiments, the at least one interactive device (270) may include a web service that may be hosted in a cloud (270a) or a smart phone (270b) interface. In some other embodiments, the at least one interactive device (270) may be a computer (270c) or a workstation interface at the enterprise site or at remote location or HMI (270d) terminal, that my either be portable and handheld or fixed (such as benchtop).

Continuing further with FIG. 3, the GID (205) is provided with application repository module (280). In some embodiment, the application repository module (280) includes an application module (not shown in FIG. 3) including at least one natural language processing (NLP) algorithm. The at least one NLP algorithm is used process the user request i.e., the first instruction. The first instruction is typically in the natural language of the user and is also unstructured. More particularly, the first instruction is not in a format that the at least one field device of the plurality of field devices (160ac) may interpret and understand to respond to it. In one or more embodiments, the NLP algorithms interprets and understand such unstructured first instruction and enable formulating (i.e., converting into) a second instruction in a structured format native to the at one field device of the plurality of field devices (160a-c). The at least one field device may interpret the second instruction and respond to it.

In one or more embodiments, the at least one NLP algorithm performs the appropriate interpretation of unstructured first instruction from the user in the user's natural language through use of different mechanisms such as rule-based pattern matching, machine learning approaches, and the like to convert into the second instruction native to the at least one field device. The application repository module (280) may further include a fault handler program to handle any faults or exceptions faced in the GID (205) and analytics module to develop analytics associated with the nature of the commands processed by the GID (205) and the success rate in terms of the correctly interpreted commands. In some embodiments, the GID (205) is also provided with a knowledgebase (210) that may host knowledge associated with various natural language historical interactions between the users and at one field device of the plurality of field devices (160a-c). In the illustrated embodiment, the knowledgebase (210) is a cloud knowledgebase. The cloud knowledgebase (210) may also host information associated with use of various NLP algorithms for processing user's instructions. Further, the cloud knowledgebase (210) may also host most task-specific datasets that contain labeled instructions to respond to the first instruction.

In some embodiments, the at least one field device of the plurality of field devices (160a-c) may include monitoring devices (such as sensors) and control devices (such as valves) for monitoring and controlling industrial processes of an industrial automation system. Even though the term "field device" is used herein, the present invention may also include any industrial devices that may monitor or control the industrial process of the process plant, and can communicate with the GID (205), for instance, an analyzer, or any other industrial assets of the industrial automation system. The at least one field device (160a-c) communicate information related to a function performed by the at least one field device (160a-c) in the industrial processes to the GID (205) over a field network using traditional fieldbus communication protocol link (295). Nature of the information that is transmitted from the at least one field device (160a-c) may typically be associated with the control or/and monitor parameters of industrial process. The monitor parameters may include values associated with monitoring the industrial process, such as health of the at least one field device, and the like. The control parameters may include values associated with controlling the industrial process, such as changing the flow rate, and the like.

Figure 4:
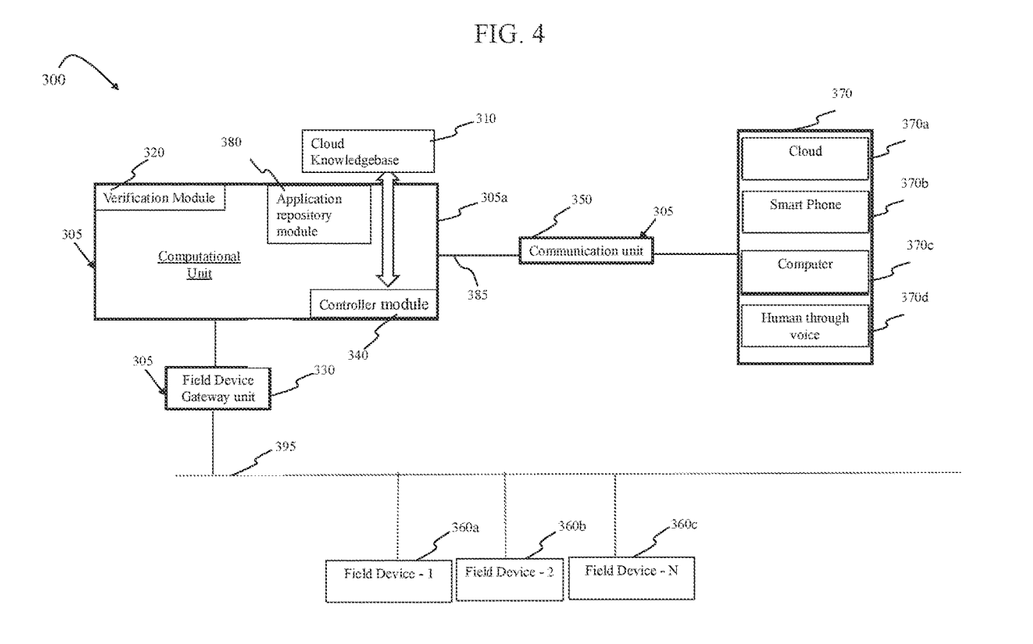
FIG. 4 is a simplified view of a system architecture of an industrial automation system illustrating interaction between a computational unit, an interactive device, and a plurality of field devices for managing an industrial process associated to an operation of a process plant, according to another embodiment of the present invention.

FIG. 4 illustrates a simplified view of a system architecture (300) of an industrial automation system illustrating interaction between a computational unit (305a), an interactive device (370), and a plurality of field devices (360a-c) for managing an industrial process associated to an operation of a process plant, according to another embodiment of the present invention. In one embodiment, the system architecture (300) of the industrial automation system further includes a communication unit (350) and a field device gateway unit (330). In one or more embodiments, the computational unit (305a), the communication unit (350), and the field device gateway unit (330) may collectively be referred to as a "gateway interface device" (GID) (305).

In other words, the computational unit (305a) illustrated in embodiment of FIG. 4 is segregated from the communication capabilities. Thus, the GID (305) is substantially similar to the GID (205) of FIGS. 2-3 except that the communication capabilities of GID (305), for example, the communication unit (350) and the field device gateway unit (330) are segregated from the GID (305). In the illustrated embodiment, the computational unit (305a) and the communication unit (350) are discrete units. The communication unit (350) is used to bi-directionally connect the computational unit (305a) with the at least one interactive device (370) via a communication protocol link (385). Similarly, the computational unit (305a) and the field device gateway unit (330) are discrete units. The field device gateway unit (330) is used to bi-directionally connect the computational unit (305a) with the at least one field device of the plurality of field devices (360a-c) via a fieldbus communication protocol link (395).

The computational unit (305a) includes all software applications and libraries associated with computational capabilities, as discussed in the computational unit (205a) in embodiment of FIG. 3. More specifically the computational unit (305a) includes a verification module (320), a controller module (340), and an application repository module (380). Furthermore, the computational unit (305) also include knowledgebase (310), for example, a cloud knowledgebase to store and archive information associated with storing training data sets, historical information, and the like.

In some embodiments of the invention, the communication unit (350) is configured to provide support for most connectivity protocols such as Z-Wave, ZigBee, Bluetooth LE, and the like via the communication protocol link (385), which enables connecting any industrial asset or interactive device (370) from any vendor or vintage to the computational unit (305a).

In some embodiments of the invention, the field device gateway unit (330) is configured to provide support across different communication protocols such as Wi-Fi; Bluetooth; serial ports, Ethernet; Message Queuing Telemetry Transport (MQTT), Zigbee; Highway Addressable Remote Transducer (HART), FOUNDATION Fieldbus, Profibus, Modbus, and the like via the fieldbus communication protocol link (385), which enables connecting any industrial asset or field device (360a-c) from any vendor or vintage to the computational unit (305a).

In one or more embodiments, the communication unit and the field device gateway unit (350 and 330) may perform several other functions such as device connectivity, protocol translation, data filtering (removing of parts of words such as stop words, punctuation, and the like) and processing (dealing with capitalization, tokenizationation, word vectors, and the like), security, updating, management, and the like. Further, the security may be addressed through configuration of permissions and security policies through, for instance, a number of roles and permissions predefined through a policy manager application. Similarly, any user added to a role may automatically inherit the permissions associated with that role. If the user is added to multiple roles, that user may be granted permissions associated with all the roles. The permission may be associated with such tasks as read, query, update, and the like. The decisions to grant access to the user is based on the roles that individual user perform such as device administrator, installation engineer, maintenance engineer, maintenance technician, and the like.

In one or more embodiments of the invention, the computational unit (205a) as discussed in FIG. 3 or the computational unit (305a) as discussed in FIG. 4 may be either hosted as cloud based or/and on-site service. Depending on the embodiment used (FIG. 3 or FIG. 4), either the GID (205) or the computational unit (305a) may be equipped with a natural language processing (NLP) algorithm (or engine) with interactive interfaces to handle text, and voice-based speech, and GUI based instruction from the user. The NLP engine offers a collection of NLP algorithms and libraries to interpret the instructions from the user and interprets the context of the instruction.

The user may then interact with the at least one field device (160a-c or 360a-c) using ways the user likes (such as choice of language used for either text or speech or GUI). Thus, the user need not undergo any prior training or have prior knowledge on how the instructions will be retrieved and the nature of input command format that may be needed to receive specific data from the at least one field device (160a-c or 360a-c). Specific training on obtaining information or interpretation of the instruction may no more be necessary since the GID (205) or the computational unit (305a), using the NLP engine with its algorithms, may enable use of both structured and unstructured user's language for interfacing with the at least one field device (160a-c or 360a-c).

In certain embodiments of the invention, the NLP engine may be local to the GID (205) or the computational unit (305a) with an offline knowledgebase which may assist in the basic interactions with the user. In some other embodiments of the invention, the NLP engine may also be hosted on the cloud along with the knowledgebase (210, 310). In such embodiments, the knowledgebase (210, 310) may include any training or learning data associated with the NLP algorithms. Further, the NLP algorithms may be pre-trained models. The training may be complemented with rule-based pattern matching techniques as well. In some embodiments, the GID (205) or the computational unit (305a) may also be equipped with a cloud connector (not shown) to help in more advanced interactions like facilitating of computationally intensive functions or/and invoking a digital assistant and the like to interact with the interactive device.

Figure 5:
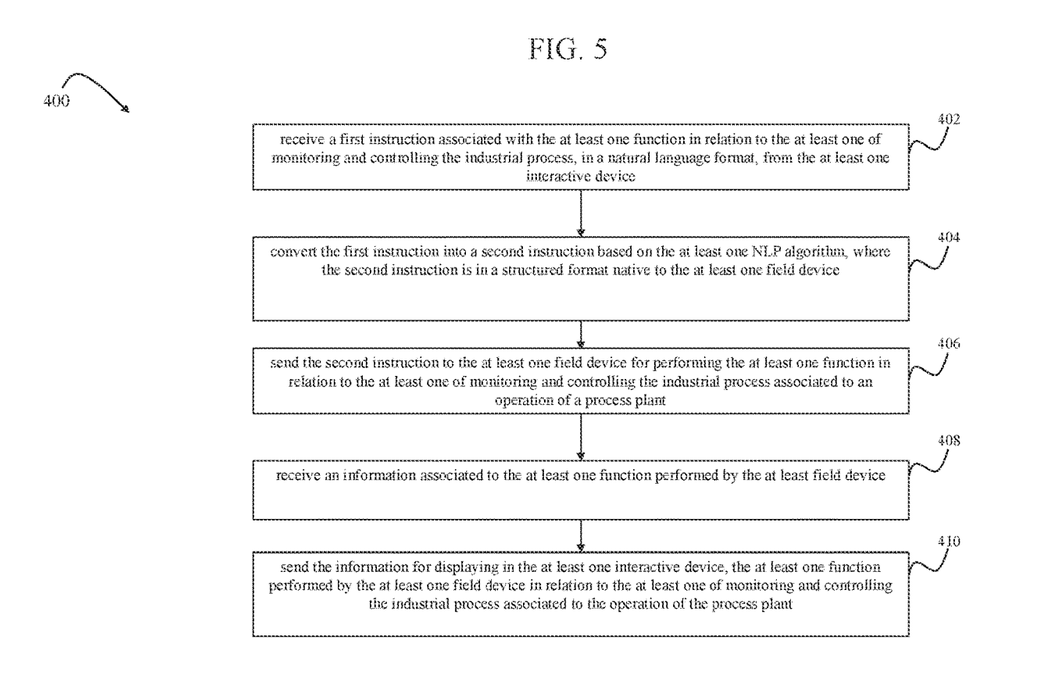
FIG. 5 is a flowchart illustrating a method for interactively communicating with at least one field device of an industrial automation system, according to an embodiment of the present invention.

FIG. 5 is a flowchart illustrating a method (400) for interactively communicating with at least one field device of a plurality of field devices of an industrial automation system, according to an embodiment of the present invention. In some embodiments of the invention, the at least one field device is associated with a gateway interface device (GID) and communicatively coupled to at least one interactive device. In one or more embodiments, the GID may enable the at least one interactive device to interactively communicate with the at least one field device for performing at least one function in relation to at least one of monitoring and controlling an industrial process associated to an operation of a process plant, where the GID includes at least one natural language processing (NLP) algorithm.

At 402, the method (400) includes the GID receiving a first instruction associated with the at least one function in relation to the at least one of monitoring and controlling the industrial process, in a natural language format, from the at least one interactive device. In some embodiments, the GID may receive login credentials of the user before receiving the first instruction, to perform authorizing or validating of the user based on the login credentials, and determine a role of the user in the industrial automation system. Upon successful validation of the user, the GID may process the first instruction. In some embodiments, the first instruction may be a command in text/speech/GUI form to query at least one field device. The command may be sent through at least one interactive device, such as phone/computer/HMG device in user's natural language format.

At 404, the method (400) includes the GID converting the first instruction into a second instruction based on the at least one NLP algorithm, where the second instruction is in a structured format native to the at least one field device. In some embodiments of the invention, the GID interprets the user's language phrases in the first instruction to convert the first instruction into the second instruction. The GID interactively communicates the second instruction with the at least one interactive device to receive feedback from the at least one interactive device on the second instruction. In one or more embodiments, the first instruction is typically in an unstructured format. Once, the user confirms interpretation of the first instruction by the GID in the form of the feedback, the GID maps the first instruction and the deciphered second instruction to create a labeled instruction and updates the knowledgebase with the labeled instruction. The knowledgebase may be further used for training the at least one NPL algorithm (models).

All such dataset (labeled instructions) and trained models may be shared over the cloud as additional services. The GID uses at least one NLP algorithm from libraries to interpret the received first instruction. In certain other embodiments, the GID may also perform various raw data pre-processing such as conversion of voice-data to spectrograms to capture human speech characteristics, improving signal-to-noise ratio through use for various noise reduction techniques (such as spectral subtraction, adaptive noise cancellation), use speech-to-text conversion tools to convert the first instruction in speech form into text form before converting the first instruction into the second instruction. Further, the GID may have intent extraction software application using a Natural-Language-Understanding (NLU) algorithms to understand the type of action conveyed in the sentences of the first instruction. Once the intent of the first instruction is deciphered, it is relayed to the user for confirmation of the same. In some embodiments, the GID also includes a configuration module to identify a type of the at least one field device, which the user is trying to monitor or control through the first instruction so as to select the structured format native to the at least one field device before converting the first instruction into the second instruction.

In some embodiments, the GID is further configured for mapping the first instruction with the second instruction to create a knowledgebase of the labeled instruction. The at least one NLP algorithm used for converting the first instruction into the second instruction may be pre-configured by providing trainings. In some embodiments, training the at least one NLP algorithm may be performed with multiple instructions which are similar to the first instruction to create the labeled instruction.

At step 406, the method (400) includes the GID sending the second instruction to the at least one field device for performing the at least one function in relation to the at least one of monitoring and controlling the industrial process. In other words, the at least one field device receives the second instruction and performs the action corresponding to the second instruction. For example, in one embodiment, the second instruction may be related to the function of monitoring a flow rate in the industrial process. Accordingly, the at least one field device monitors the flow rate in the industrial process. In another embodiment, the second instruction may be related to function of controlling the flow rate in the industrial process. Accordingly, the at least one field device may actuate a valve position to control the flow rate in the industrial process. In yet another embodiment, the second instruction may relate monitoring temperature from the plurality of field devices in the industrial process.

Accordingly, the plurality of field devices may monitor the temperature in the industrial process. In yet another exemplary embodiment, the second instruction may relate to controlling the plurality of field device to increase the temperature of the industrial application to reach a setpoint temperature. In some embodiment, the setpoint temperature may be calculated by the user based on the temperature parameter monitored by the plurality of field devices.

At step 408, the method (400) includes the GID receiving an information associated to the at least one function performed by the at least field device. In other words, the at least one field device sends the information back to the GID as a response or result of the performed function in the structured format. At step 410, the method (400) includes the GID sending the information for displaying in the at least one interactive device, the at least one function performed by the at least one field device in relation to the at least one or monitoring and controlling the industrial process associated to the operation of the process plant.

Specifically, the GID relays the information to the user in the user's natural language i.e., either in text or/and speech form to be displayed in the at least one interactive device. Once the user confirms the completion of the function performed by the at least one field device, the GID closes all open actions with at the least one field device.

Figure 6:
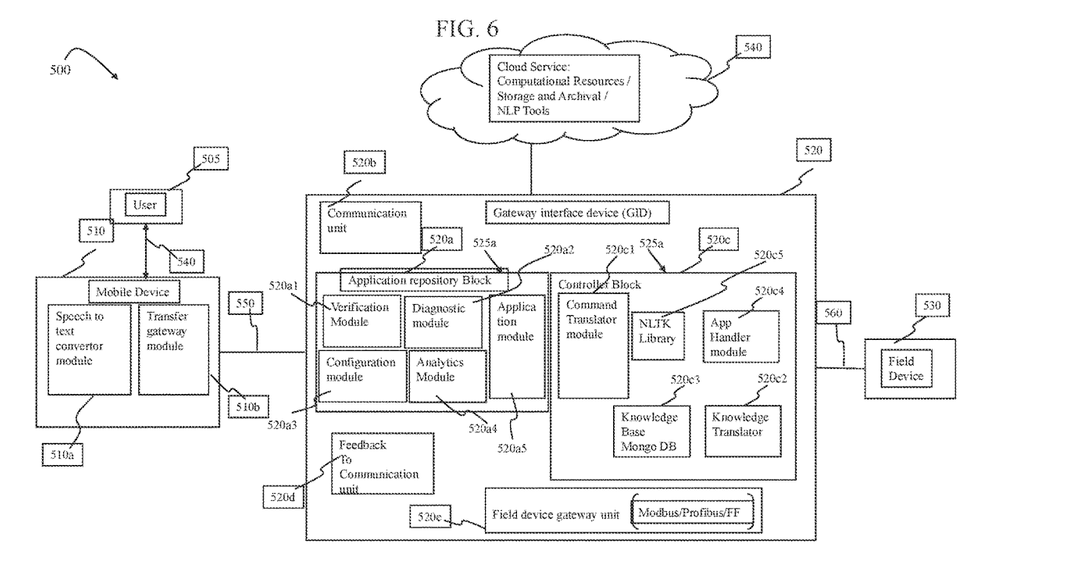
FIG. 6 is a system architecture of an industrial automation system illustrating interaction between at least one interactive device, a gateway interface device (GID), and at least one field device for managing an industrial process associated to an operation of a process plant, according to an embodiment of the present invention.

FIG. 6 is a system architecture (500) of an industrial automation system illustrating interaction between at least one interactive device (510), a gateway interface device (GID) (520), and at least one field device (530) for managing an industrial process associated to an operation of a process plant, according to an embodiment of the present invention. In some embodiments, managing an industrial process associated to an operation of the process plant includes performing at least one function in relation to at least one of monitoring and controlling the industrial process. In the illustrated embodiment, the system architecture (500) includes the GID (520) interfacing the at least one field device (530), so as to provide an interactive interface for a user (505) to communicate with the at least one field device (530) using the at least one interactive device (510). In the illustrated embodiment, the GID (530) has computation and communication abilities. In other words, the GID (530) includes a computational unit (525*a*) to provide the computation ability to perform at least one function in relation to managing the industrial process associated to the operation of the process plant. Further, the GID (530) includes a communication unit (520*b*), a feedback to communication unit (520*d*), and a field device gateway unit (520*e*) to provide the communication ability to perform the communication between the at least one interactive device (510) and the at least one field device (530).

In one embodiment, the at least one interactive device (510) is a mobile device, which includes a speech to text convertor module 510*a*, and a transfer gateway module (510*b*). Similarly, the GID (520) includes an application repository block (520*a*), the communication unit (520*b*), a controller block (520*c*), the feedback to communication unit (520*d*), the field device gateway (520*e*). In the illustrated embodiment, the application repository block (520a) includes a verification module (520a1), a diagnostic module (520a2), a configuration module (520a3), an analytics module (520a4), and an application module (520a5) comprising at least one natural language processing (NLP) algorithm. Similarly, the controller block (520c) includes a command translator module (520c1), a knowledge translator module (520c2), knowledgebase (520c3), an application handler module (520c4), and a NLTK library (520c5). Further, the GID (520) is communicatively coupled to a could service (540).

In the illustrated embodiment, the at least one interactive device (510) is communicatively coupled to the GID (520) via a computation protocol link (550), for example, a Wi-Fi network. Similarly, the GID (520) is communicatively coupled to the at least one field device (530) via a fieldbus communication protocol link (560), for example, HART network.

During operation of the industrial automation system (500), the user (505) sends a first instruction, for example, a voice (speech) instruction, such as "I want to perform a verification on Device that has ID 10." This first instruction is converted to text 20 form either on the at least one interactive device (510) (herein after also referred to as a "mobile device") or on the GID (520) or further onto the cloud (540). It should be noted herein that, without the GID (520) the user may be restricted to provide first instruction using specific and rigid predefined structure to the at least one field device (530). In one or more embodiments, the mobile device (510) may be provided with the speech to text convertor module (510a) having a plurality of software applications that are pre-installed and pre-configured to convert the received first instruction in the speech form to a plain text form using NLP algorithms or NLP application programming interfaces (APIs) such as Google Speech to text API or Dialog-Flow APIs, and the like. In some embodiments, the first instruction in speech form may be further sent to the GID (520), where the natural language toolkit (NLTK) libraries (520c5) may perform any necessary pre-processing (improving signal to noise ratio, spectral correction) before performing the speech-to-text conversion of the first instruction. In some other embodiments, the GID (520) may send the first instruction in voice/speech form to the cloud service (540), for example, using the google speech-to-text APIs for conversion into plan text form of the first instruction.

In some embodiments, the cloud service (540) is used, because the cloud service (540) is typically provided with additional computational resources of hardware and software and may be better to process the first instruction in speech form to text form, where the mobile device (510) or the GID (520) may not have a sufficient computation resources to perform extensive computations.

The application handler module (520c4) receives the first instruction in text form and interprets the first instruction to determine an appropriate module from the application repository block (520a) for execution of the first instruction. The application handler module (520c4) may use the NLTK library (520c5) to perform the task of interpreting the first instruction in text form, by different mechanism such as by marking the key words and key commands in the plain text command and using knowledge translator (520c2) module to interpret those key words to find the intent of the operator that has issued the command to start with. Once the intent of the first instruction is identified, the application handler module (520c3) communicates the first instruction to the application module (520a5) for further interpretation.

For example, the first instruction from the user (505) may be in the natural language format to monitor health of the at least one field device having id no. 10. Therefore, the first instruction may be "I want to perform a verification on device that has ID 10". The application module (520a5) interprets the first instruction to convert the first instruction into a second instruction. The second instruction is in a structured format native to the at least one field device (530). The second instruction may be "Do verification on device 10". In one embodiment, the application module (520a5) uses the at least one NLP algorithm to convert the first instruction into the second instruction. In some other embodiments, the GID (520) may use the cloud service (540) having additional computational resources of hardware and software to convert the first instruction into the second instruction.

In one or more embodiments, the NLP algorithms are also trained and undergo learning as they are used with newer first instruction received from the user (505). This enables the at least one NLP algorithm to be aware of the context. For example, if the user (505) does not provide any of the required inputs fields (such as leaving out device ID number), the at least one NLP algorithm may automatically prompt the user (505) for the required input fields. Further, the knowledge database (such as MongoDB, MySQL, XMl, BaseX, etc.) holds repository of process information, field device interactions, typical operation sequences, all learned information from previous user interactions, updated learning from current operator interactions. The knowledge database (520c3) also stores information in the form of files such as an electronic data description (EDD) file that contains field device description.

Further, the feedback to communication unit (520d) communicates the second instruction to the mobile device (510) for receiving the feedback from the user (505) on the second instruction. Upon receipt of confirmation from the user (505) on the accuracy of the second instruction, the command translator module (520c1) may identify type of the at least one field device (540) to which the first instruction is issued from the user (505) and translate the second instruction into formats and protocols that the at least one field device (540) may interpret. Examples of such translations may involve conversion of second instruction, into HART commands, where the at least one field device (530) is only capable of interpreting the HART commands.

Continuing with FIG. 6, the field device gateway (520e) connects with the at least one field device (540) with specific ID over the applicable protocols and sends the second instruction to specific field device, such as sending "Do verification" to field device that is recognized as having ID no. 10. The field device (with ID 10) receives this command, interprets it, and executes the task specified by the command. In this example, the field device (540) with ID 10 performs verification tests with various test parameters (such as internal diagnostic check, sensor group, setpoint calculation, and the like). Once the verification is complete, the field device (with ID 10) provides PASS/FAIL result together with relevant diagnostic information to a series of tests performed on the at least one field device (540). Further, the at least one field device (540) with ID 10 pushes the information back to the field device gateway (520e). The information may be associated to the at least one function performed by the at least field device (540). The field device gateway unit (520e) gathers information from the at least one field device (540) and relays the information to the application repository block (520a). The application repository block (520a) includes an application module (520a5) to further convert the first instruction into user natural language, form using the at least one NLP algorithm and send this information to the communication unit (520*b*). The communication unit (520*b*) then pushes the received information to the at least one interactive device (510) for displaying the at least one function performed by the at least one field device (540) for performing at least one function in relation to at least one of monitoring and controlling the industrial process associated to operation of the process plant. In certain embodiments, the function performed by the at least one field device may include calibration, configuration, control, testing, and the like. In some embodiments, the controlling the at least one field device may involve for instance, regulating a control valve, performing corrective actions in response to a diagnostics information, controlling set point in the plurality of field devices. In some embodiments, the diagnostic module (520*a*2) may perform test on the at least one field device (540) of the plurality of field devices to monitor the health of the at least one field device (540).

Similarly, the configuration module (520*a*3) may perform configuration of the at least one field device (540), and the analytics module (520*a*4) may be used for training the at least one NLP algorithm based on the input processed by the computational unit and success rate in terms of correctly interpreted first instruction to generate the second instruction.

Disclosed method and system for interactively communicating with the at least one field device for performing at least one function in relation to at least one of monitoring and controlling the industrial process of the process plant enables a new generation of industrial engineers to effectively perform their task without additional time and effort needed for training and retraining in various technologies and protocols. Also, the GID or the computational unit demystify the field devices to the field device operators interacting with it, thereby enable fluid and conversational style interactions between them.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for interactively communicating with at least one field device of a plurality of field devices of an industrial automation system for performing at least one function in relation to at least one of monitoring and controlling an industrial process associated to an operation of a process plant, wherein the at least one field device is associated with a gateway interface device (GID) and communicatively coupled to at least one interactive device, wherein the GID comprises at least one natural language processing (NLP) algorithm, the method comprising the GID:
receiving a first instruction associated with the at least one function in relation to the at least one of monitoring and controlling the industrial process, in a natural language format, from the at least one interactive device;
interpreting the first instruction into a second instruction based on the at least one NLP algorithm;
interactively communicating the second instruction with the at least one interactive device to receive a feedback from a user on an accuracy of the second instruction;
upon receipt of confirmation from the user on the accuracy of the second instruction, identifying a type of the at least one field device and selecting a structured format that the type of the at least one field device is able to interpret, and converting the second instruction into the structured format;
sending the second instruction in the structured format to the at least one field device for performing the at least one function in relation to the at least one of monitoring and controlling the industrial process;
mapping the first instruction with the second instruction to create a knowledgebase of a labeled instruction;
receiving an information associated to the at least one function performed by the at least field device;
sending the information for displaying in the at least one interactive device, the at least one function performed by the at least one field device in relation to the at least one of monitoring; and
controlling the industrial process associated to the operation of the process plant.

2. The method as claimed in claim 1, further comprising training the at least one NLP algorithm with multiple instructions to create the labeled instruction.

3. The method as claimed in claim 1, wherein receiving the first instruction comprises obtaining the first instruction in a form of at least one of a speech, a text, and a graphical user interface (GUI) input.

4. The method as claimed in claim 1, wherein receiving the first instruction further comprises obtaining the first instruction from the at least one interactive device to interactively communicate with the plurality of field devices for performing the at least one function in relation to the at least one of monitoring and controlling the industrial process.

5. A system of a gateway interface device (GID) and at least one field device of a plurality of field devices in an industrial automation system to interactively communicate with the at least one field device for performing at least one function in relation to at least one of monitoring and controlling an industrial process associated to an operation of a process plant, wherein the at least one field device is communicatively coupled to at least one interactive device, wherein the GID comprises a computational unit comprising at least one natural language processing (NLP) algorithm, a communication unit, and a field device gateway unit associated to each other, and wherein the communication unit is configured to receive a first instruction associated with the at least one function in relation to at least one of monitoring and controlling the industrial process, in a natural language format, from the at least one interactive device;

wherein the computational unit comprises an application module configured to interpret the first instruction into a second instruction based on the at least one NLP algorithm, and to interactively communicate the second instruction with the at least one interactive device to receive a feedback from a user on an accuracy of the second instruction, wherein the computational unit further comprises a configuration module configured to, upon receipt of confirmation from the user on the accuracy of the second instruction, identify a type of the at least one field device and to select a structured format that the type of the at least one field device is able to interpret, and convert the second instruction into the structured format;

wherein the field device gateway unit is configured to:
send the second instruction in the structured format to the at least one field device for performing the at least one function in relation to the at least one of monitoring and controlling the industrial process; and receive an information associated to the at least one function performed by the at least field device;

wherein the system further comprises a knowledgebase communicatively coupled to the computational unit, wherein the computational unit is configured to map the first instruction with the second instruction to create a labeled instruction in the knowledgebase;

wherein the communication unit is further configured to send the information for displaying in the at least one interactive device, the at least one function performed by the at least one field device in relation to the at least one of monitoring and controlling the industrial process associated to the operation of the process plant.

6. The system as claimed in claim 5, wherein the computational unit and the communication unit are discrete units, wherein the communication unit is used to bidirectionally connect the computational unit with the at least one interactive device.

7. The system as claimed in claim 5, wherein the computational unit and the field device gateway unit are discrete units, wherein the field device gateway unit is used to bi-directionally connect the computational unit with the at least one field device.

* * * * *